E. H. PIERSEN.
TELEGRAPH TRANSMITTER.
APPLICATION FILED MAY 19, 1913.
1,289,900.
Patented Dec. 31, 1918.
8 SHEETS—SHEET 1.
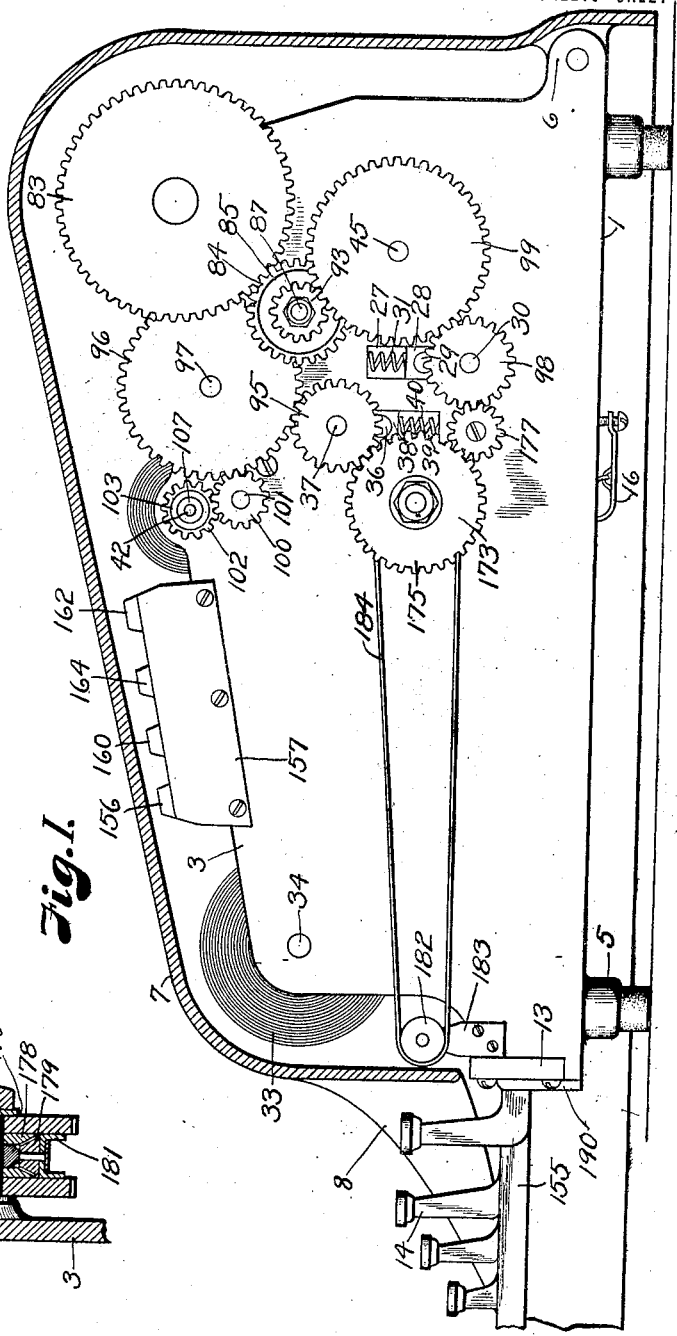
WITNESSES:
Arthur W. Capp.
Lewis L. Miller.
INVENTOR
Edwin H. Piersen.
BY
Arthur C. Brown
ATTORNEY

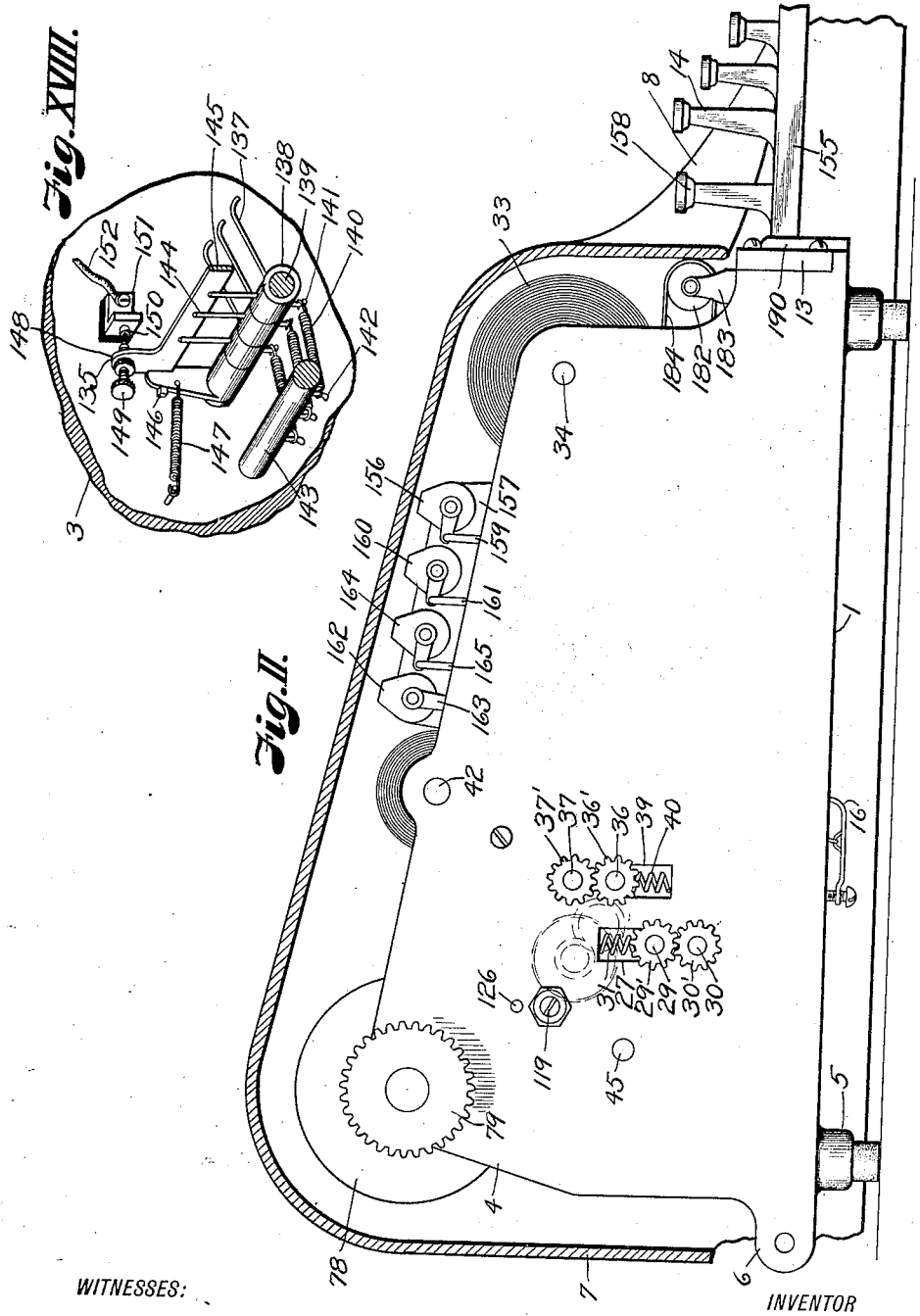

E. H. PIERSEN.
TELEGRAPH TRANSMITTER.
APPLICATION FILED MAY 19, 1913.
1,289,900.
Patented Dec. 31, 1918.
8 SHEETS—SHEET 3.
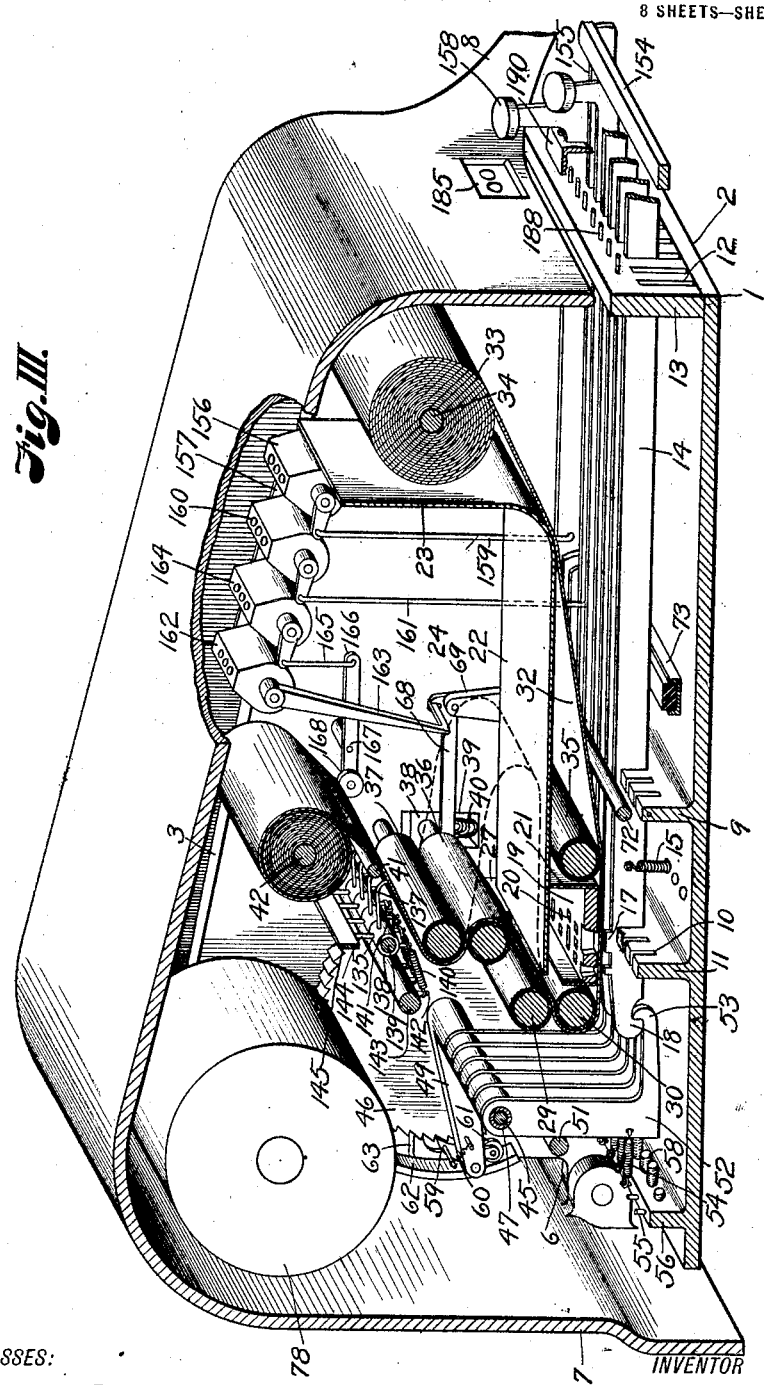
Fig. III.
WITNESSES:
Arthur W. Caps.
Lewis L. Miller.
INVENTOR
Edwin H. Piersen.
BY
Arthur C. Brown,
ATTORNEY

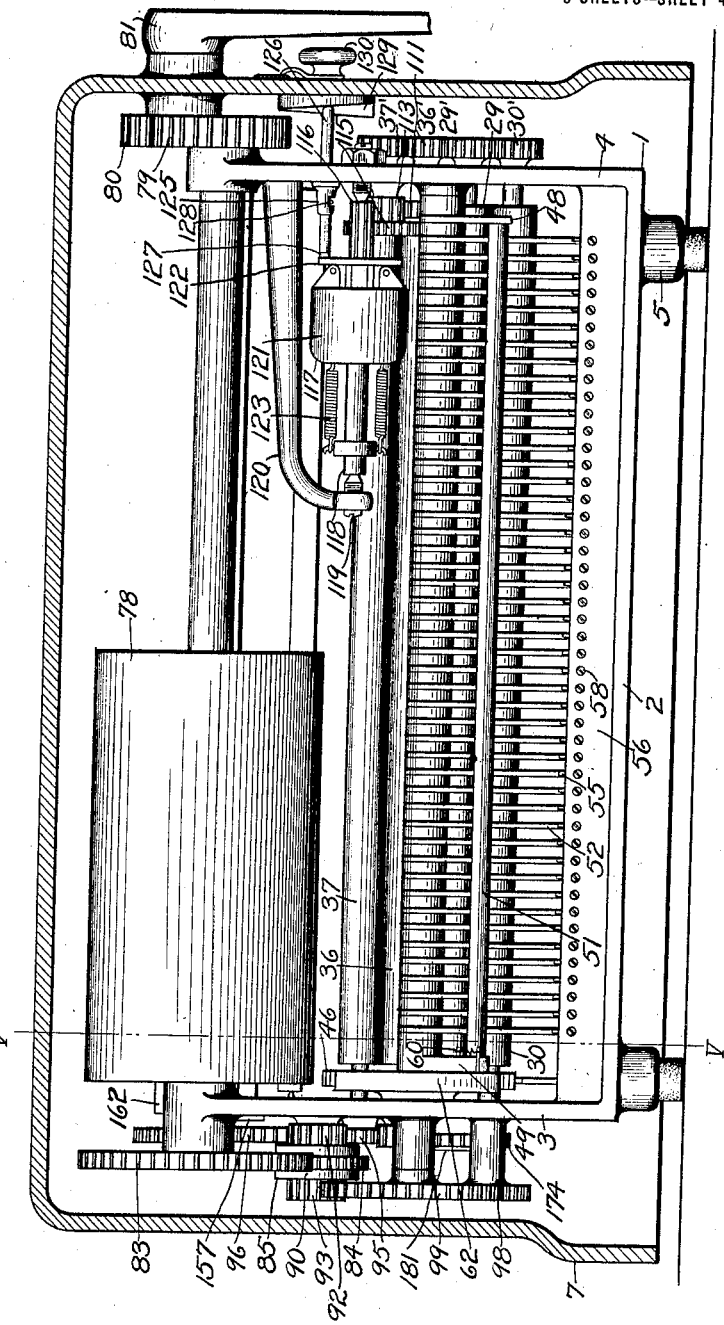

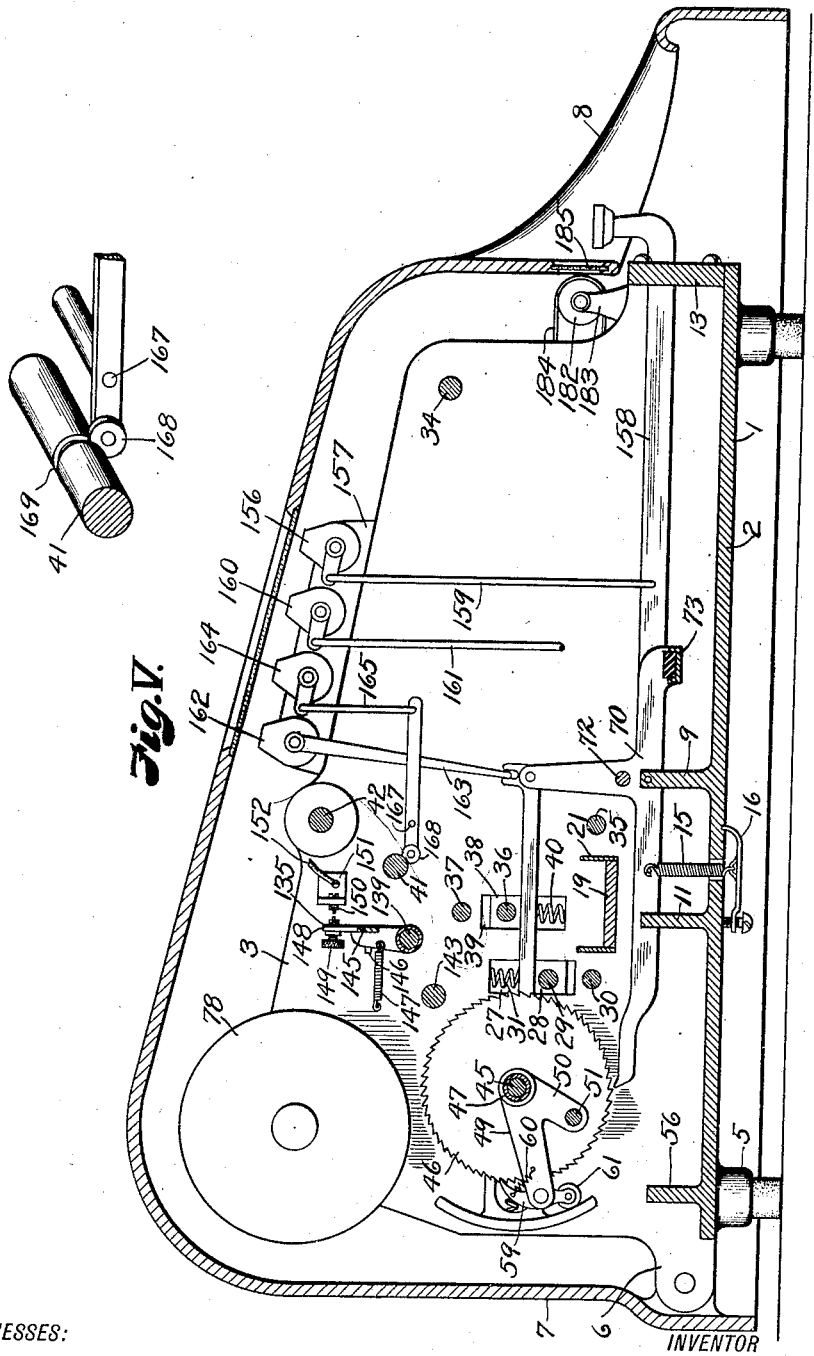

E. H. PIERSEN.
TELEGRAPH TRANSMITTER.
APPLICATION FILED MAY 19, 1913.
1,289,900.
Patented Dec. 31, 1918.
8 SHEETS—SHEET 6.
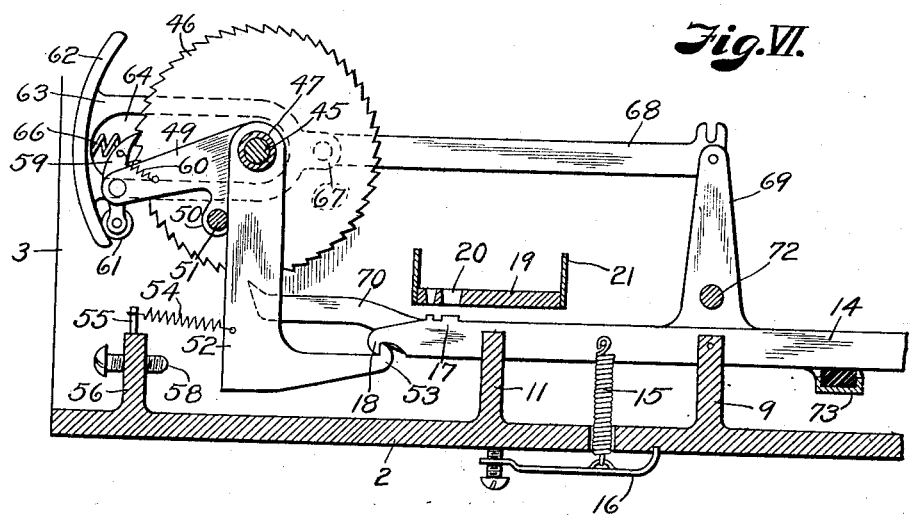
*Fig. VI.*
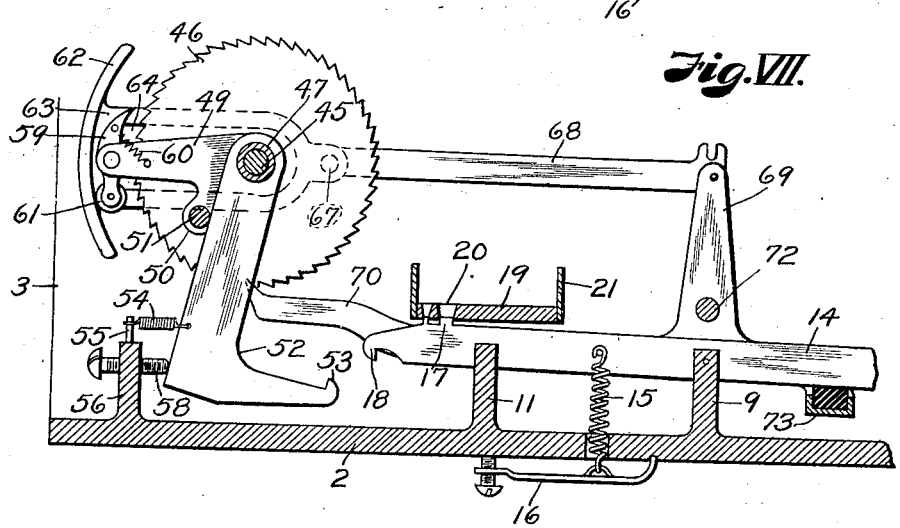
*Fig. VII.*
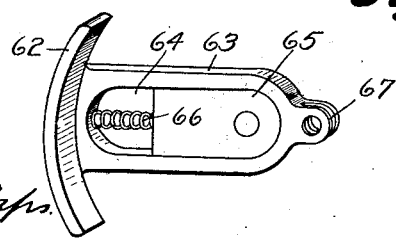
*Fig. VIII.*
WITNESSES:
Arthur W. Caps.
Lewis L. Miller.
INVENTOR
Edwin H. Piersen.
BY
Arthur C. Brown
ATTORNEY E. H. PIERSEN.
TELEGRAPH TRANSMITTER.
APPLICATION FILED MAY 19, 1913.
1,289,900.
Patented Dec. 31, 1918.
8 SHEETS—SHEET 7.
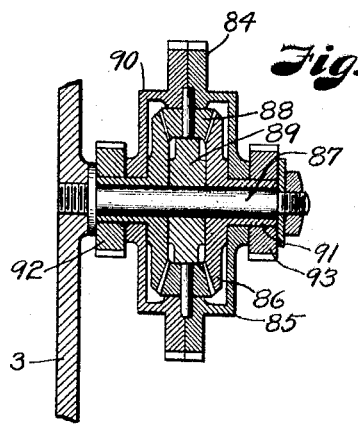
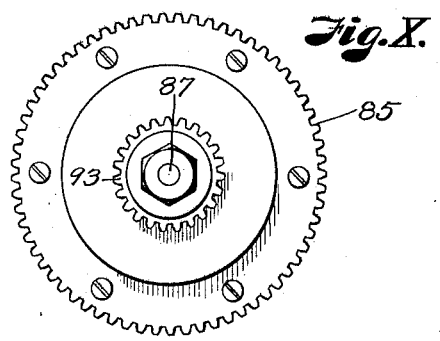
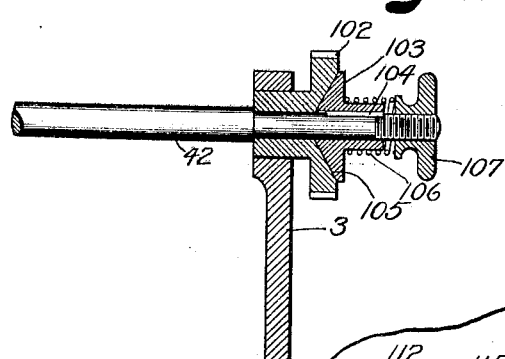
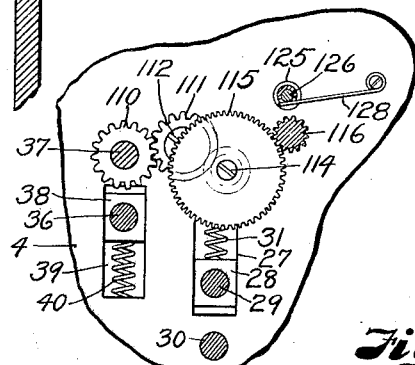
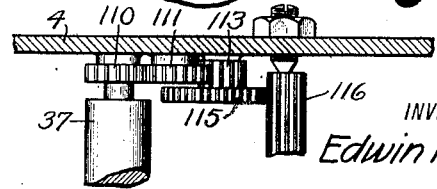
WITNESSES:
Arthur W. Caps.
Lewis L. Miller.
INVENTOR
Edwin H. Piersen.
BY
Arthur C. Brown
ATTORNEY E. H. PIERSEN.
TELEGRAPH TRANSMITTER.
APPLICATION FILED MAY 19, 1913.
1,289,900.
Patented Dec. 31, 1918.
8 SHEETS—SHEET 8.
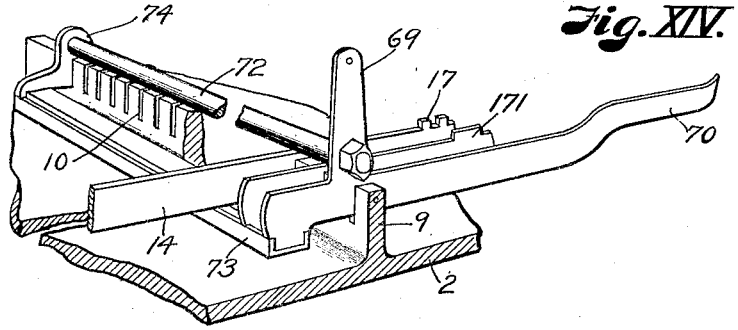
Fig. XIV.
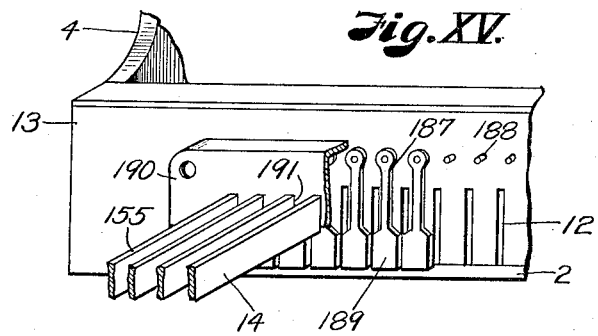
Fig. XV.
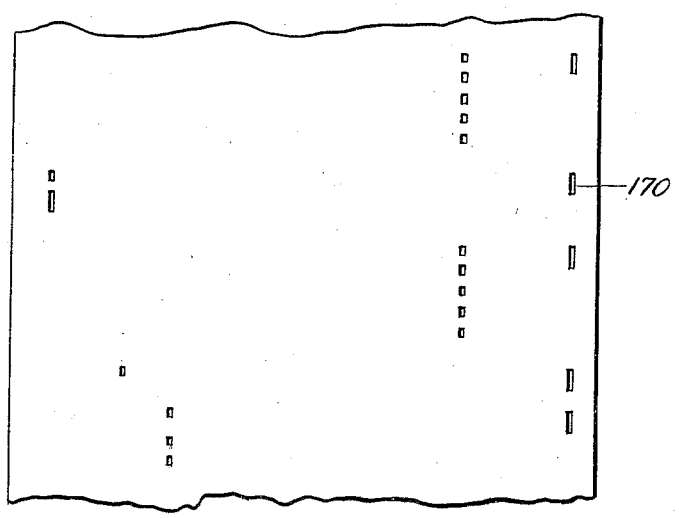
Fig. XVI.
WITNESSES:
Arthur W. Caps.
Lewis L. Miller.
INVENTOR
Edwin H. Piersen.
BY
Arthur C. Brown
ATTORNEY

UNITED STATES PATENT OFFICE.

EDWIN H. PIERSEN, OF TOPEKA, KANSAS, ASSIGNOR TO THE PIERSEN TELEGRAPH TRANSMITTER COMPANY, OF TOPEKA, KANSAS, A CORPORATION OF KANSAS.

TELEGRAPH-TRANSMITTER.

1,289,900.   Specification of Letters Patent.   Patented Dec. 31, 1918.

Application filed May 19, 1913. Serial No. 768,473.   REISSUED

*To all whom it may concern:*

Be it known that I, EDWIN H. PIERSEN, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to telegraph transmitters, and more particularly to a device of the keyboard type, wherein character indicating or impressing mechanism is operated or released by means of an ordinary key lever, to produce an initial character indication, which is afterward carried by or in proximity to a circuit closer, whereby the character indications are transformed into electrical impulses.

In the present embodiment of the invention, I utilize a traveling web and provide the key levers with dies whereby the web is punched upon the actuation of the levers, to provide apertures or depressions in the web, which, when carried past the circuit closer, actuate the closer and in turn make and break a circuit to transmit electrical impulses corresponding to the ordinary Morse or other telegraphic code.

In order to adapt the apparatus for use by untrained persons, I provide for storing the web after receiving its character impressions, so that the keyboard may be operated at a different speed from the circuit closer, thereby not only providing for additional speed in "setting" a message but also obviating interference between the characters.

In order that the operator may keep a record of the number of messages, words and letters sent, and may at all times know the amount of storage in the apparatus, I provide indicators for giving this information, together with mechanism whereby the indicators may be properly actuated during the operation of the main machine.

In accomplishing the above mentioned objects of the invention, I provide improved details of structure, the preferred forms of which are illustrated in the accompanying drawings, wherein:—

Figure I is a side elevation of a machine constructed according to my invention, the case being in section and partly broken away.

Fig. II is a similar view of the opposite side of the machine.

Fig. III is a longitudinal sectional perspective view, showing the interior mechanism.

Fig. IV is a rear elevation of the machine, the case being in section.

Fig. V is a longitudinal sectional view of the machine on the line V—V, Fig. IV.

Fig. VI is a detail sectional view of the variable escapement.

Fig. VII is a similar view of the same, the parts being shown in operative position.

Fig. VIII is a detail perspective of the ratchet pawl tripping device.

Fig. IX is a sectional view of the differential gearing.

Fig. X is an elevation of the same.

Fig. XI is a sectional view of the web rewinding shaft.

Fig. XII is a side elevation of the governor gearing.

Fig. XIII is a plan view of the same.

Fig. XIV is a perspective view of a portion of the machine, showing the character indicating punch and its relation to the surrounding parts.

Fig. XV is a detail perspective view of the key latch-board, parts being broken away for better illustration.

Fig. XVI is a plan view of a portion of the web.

Fig. XVII is a sectional view of a differential gearing for actuating the storage indicator.

Fig. XVIII is a detail perspective view of the circuit breaker and adjacent mechanism.

Fig. XIX is a detail perspective view of one of the character indicator levers.

Referring more in detail to the parts:—

1 designates a frame upon which the parts of the machine are mounted and which comprises a base 2, side members 3 and 4 and feet 5 upon which the machine is supported.

Projecting rearwardly from the side members 3 and 4 are ears 6, upon which is pivotally mounted a casing 7 that covers the entire mechanism and has a forwardly extending portion 8 adapted to inclose a typewriter keyboard of any ordinary construction.

Pivotally mounted in a rib 9, on base 2, and slidably mounted in slots 10 of a similar rib 11, and in slots 12 of a front cross member 13, are a plurality of key levers 14, which are held yieldingly in their normal position by springs 15, having adjustments 16, and which are provided on their upper edges with dies 17 corresponding with the characters of a telegraphic code, and at their rear ends with hooks 18.

Extending between the side members 3 and 4, and immediately above the dies 17, is a counter die 19 having a plurality of apertures 20 corresponding and adapted for registration with the dies 17, and having side rails 21 upon one of which rests a plate 22 having an upturned forward edge 23 adapted to inclose a storage chamber 24.

Slidably mounted in slots 27 in the side members 3 and 4 are journals 28, and revolubly mounted in said journals 28 is a roller 29, which is held yieldingly against a roller 30 revolubly mounted in the side members, by means of coil springs 31, and between which passes a web of paper, or the like, 32, that is supplied from a roll 33 on a shaft 34 near the forward part of the frame and passes beneath a guide roller 35 adjacent the counter die. Above and slightly forward of the rollers 29 and 30 are rollers 36 and 37, the latter journaled in the sides of the frame and the former in blocks 38 which are slidably mounted in slots 39 in the sides of the frame and yieldingly urged toward the roller 37 by springs 40.

After passing between the rollers 29 and 30, the web passes upwardly and forwardly between rollers 36 and 37, and over an idle roller 41 to the rewinding shaft 42 to which it is secured.

The rollers 29 and 30, and 36 and 37, have gear connection 29'—30' and 36'—37' respectively whereby the rollers of each set are positively connected with each other.

The different characters of a telegraph code are punched in the web by means of key actuated die members 17, and counter die 20, and the web forwarded a distance equal to the length of that character plus three dots, upon the operation of any key lever.

In accomplishing this action a variable escapement has been provided which comprises a shaft 45 revolubly mounted in the side members 3 and 4 of the frame, having a ratchet wheel 46 rigidly secured thereto adjacent the inner face of side member 3, and a sleeve 47 revolubly mounted on the shaft and having a lever 48 (Fig. VI) secured at one end and a lever 49 at the other, the latter being provided with an arm 50 in line with lever 48. A universal bar 51 carried by the lever 48 and arm 50 lies behind a bank of bell crank levers 52 pivotally mounted on sleeve 47 and provided with hooked end portions 53 adapted for engagement by hooks 18 of the key levers to hold them forward and in their normal position against the tension of springs 54, which are secured to pins 55 in the upper edge of a rib 56 on the frame. Adjustably mounted in the rib 56, back of each lever 52, is a set screw 58, adapted for engagement by its corresponding lever 52 and set to limit movement of its lever to an arc corresponding to the length of the character represented by the lever.

At the outer extremity of lever 49 is a ratchet pawl 59 yieldingly held in engagement with ratchet wheel 46 by a spring 60, and provided with a roller 61 at its opposite end, which is adapted for engagement by an arc-shaped bracket 62 integral with a bar 63 (Fig. VIII) which is provided with a slot 64 and adapted to slide on an elongated boss 65 on the side member 3, and which has a compression spring 66 for yieldingly holding the bracket in a rearward position.

At the forward end of the bar 63 is an eye 67 to which is connected a link 68 that is in turn connected to the upwardly extending arm 69 of a pawl lever 70 mounted and tensioned the same as the key levers, and having a torsion rod 72 that extends above, and a universal bar 73 that extends beneath the bank of key levers, both the torsion rod and the universal bar being connected to an idle lever 74 (Fig. XIV) at the opposite side of the machine.

Extending part way across the upper rear portion of the frame is a spring motor 78 which may be tensioned through gearing comprising a gear 79 on the motor that meshes with a gear 80 on the casing 7 and is provided with a hand crank 81 whereby the motor may be manually wound, and which is also provided with a gear 83 (Figs. I and IV) that meshes with the gear 84 of a differential mechanism 85, the preferred form of which comprises a pair of facing bevel gears 86 revolubly mounted upon a stub shaft 87 and meshing with a plurality of bevel pinions 88 revolubly mounted on a spider 89, which is in turn revolubly mounted on the shaft 87, and is anchored in the casing 90 of which the gear 84 is a part, and which is revolubly mounted on the extended hub portions 91 of the bevel gears 86 that also carry the spur gears 92 and 93, which are adapted to actuate the rollers 36 and 37 through the gear 95 on the roller 37 and the idle gear 96 revolubly mounted on a stub shaft 97, and the rollers 29 and 30 through the gear 98 on the roller 30, and the gear 99 rigidly mounted on the shaft 45 respectively.

In tracing the movements of this gearing, 13 let us assume the parts to be in a state of rest, and that the web is held firmly between the rollers 36 and 37, which are in turn, held against revolution by means of a governor which will hereinafter be described in detail.

The tension of the spring motor 78 is carried through the gear 83 to the gear 84 of the differential, which tensions both the bevel gears 86 and the spur gears 92 and 93, which are fixed to the hubs thereof, in the same direction by virtue of the pinions 88 which mesh with both the bevel gears 86, and which are carried by the spider 89 operatively connected with the gear 84.

It is equally true that if one of the gears 92 or 93, is held against revolution, the other may continue to revolve, because the gear 84 which receives power direct from the spring motor, carries the spider 89 and causes the pinions 88 to turn against the face of the bevel gear 86 fixed to the stationary bevel gear 86 and revolve the other bevel gear 86 which revolves the spur gears 93, 99 and 98.

The gear 99 is under direct action of the keyboard through the shaft 45, ratchet 48 and pawl 70, so that each time a key lever is depressed, the tension of the spring motor actuates the rollers 29 and 30 and the escapement to forward the web a certain distance.

It is apparent that while the keyboard is being actuated and the web forwarded, the governor may be released, so that power is transmitted from the spring motor through the gears 83 and 84, pinions 88, one of the bevel gears 86, gear 93, gear 96, and gear 95, thereby revolving the rollers 36 and 37 and forwarding the web.

It is also apparent that while the keyboard and transmitting device are both in operation, the gear 83 will revolve at a greater speed than if only one of them were in operation, because in the latter case the bevel pinions coöperate with the gears 86 and compound the speed of the gears 92 and 93, or which is the same thing applied to the present case, checks the speed of the gear 83 and prevents the motor from unwinding too fast.

The gear 96 actuates the rewinding shaft 42 through an idle gear 100 revolubly mounted on a stub shaft 101, which meshes with a gear 102 having driving connection with the rewinding shaft through a friction mechanism comprising a beveled friction collar 103 slidably mounted on a feather key 104 in the shaft and held yieldingly against the beveled face 105 of the gear by means of a spring 106 that bears against an adjusting nut 107 threaded on the end of the shaft, whereby the tension may be adjusted as desired.

Rigidly secured to roller 37 adjacent the inner face of side member 4 is a gear 110 (Figs. IV, XII and XIII) which meshes with a gear 111 revolubly mounted on a stub shaft 112 and which in turn meshes with a gear 113 revolubly mounted on a stub shaft 114, and rigidly connected to a larger gear 115 that meshes with the pinion 116 of a governor 117, the preferred form of which comprises a shaft 118, of which the pinion 116 is a part, revolubly mounted in point bearings 119 in the frame and in a bracket 120, and having pivotally mounted weights 121 which are adapted to move a disk 122 longitudinally on the shaft 118 and which are held yieldingly in their normal position by coil springs 123.

Slidably mounted in bushing 125 in the side frame 4 is a rod 126 having a leather tip 127 which is adapted to be held yieldingly from the face of disk 122 by a spring 128, and against a cam 129 in the casing 7 which is adapted for manual actuation by means of a thumb knob 130.

The tension of the spring motor 78 is distributed independently through the differential gearing 85 in two directions, the one actuating the rollers 29 and 30 and the ratchet wheel 46 which is held against revolution by the pawl 59; the other actuating the rollers 36 and 37, the governor and the rewinding shaft and which is held against revolution by the friction of the rollers on the web or by turning the thumb knob 130 so that the tip 127 bears tightly against the disk 122 and locks the governor.

Each time a key lever is depressed one or more apertures is punched in the web corresponding to that particular character. The universal bar 73 is depressed during the same operation to release ratchet pawl 59 and move pawl 70 into engagement with the ratchet wheel 46, and to release one of the bell crank levers 52, which recedes under the tension of its spring 54, moves the universal bar 51 backwardly and the pawl 59 upwardly along the face of the ratchet wheel a distance predetermined by the location of that particular set screw 58.

When the key lever is released, the pawl 59 engages the ratchet wheel 46 as the pawl 70 is released, and the ratchet wheel revolves under the influence of the spring motor to move the bar 51 against the released bell crank lever and return it to its normal position, and to turn the rollers 29 and 30 so that the web is moved ahead a distance equal to the length of the character plus three dots, or the standard space between characters.

After several characters have been recorded in the web the apertured portion passes beyond the rollers 36 and 37 beneath a circuit breaker 135, beneath the roller 41 and onto the rewinding shaft 42.

The circuit breaker comprises a plurality of fingers 137 rigidly secured to individual collars 138 revolubly mounted on a shaft 139 fixed in the frame, and individually tensioned by means of springs 140 which are connected to hooks 141 on collars 138 and hooks 142 on a shaft 143 rigidly secured in the frame.

Rising from each collar is a vertical pin 144 adapted to actuate a universal bar 145 pivotally mounted on shaft 139, held yieldingly backward against a stop 146 by means of a spring 147 and provided with an upturned ear 148 near one end, into which is threaded a contact screw 149 adapted to engage the contact screw 150 in the bracket 151 which is insulated from the frame and provided with an electric wire 152 connecting with the line, the other line wire being grounded on the frame.

As the web passes at a uniform speed through the rollers 36 and 37, by virtue of its governor control, and is taken up on the friction driven rewinding shaft, the contact fingers 137 drop into the various apertures and rock the universal bar to complete an electric circuit through the contact points 149—150.

In order to provide the proper spacing between words, I have provided the space key 154 having key levers 155 at each side of the machine, mounted and tensioned the same as the character key levers and adapted to release a bell crank lever 52 to move the web a distance equal to three dots which, in addition to the three dots on each character, makes a total of six dots between words.

In order to determine the exact working of the machine at any moment, several indicators are provided whereby the number of messages, words and characters transmitted, and the amount of web in storage, is constantly before the operator.

The message indicator comprises a counter or numbering device 156 which is secured to a bracket 157 on the frame 3 and which is connected to a key lever 158 by a link 159. The number of words sent is shown on a similar counter 160 also secured to bracket 157 and connected to the space key by a link 161.

The number of characters transmitted onto the line is indicated on the counter 164 which is connected by a link 165 to a lever 166 pivotally mounted at 167 on the frame and provided with a roller 168 which registers with a groove 169 in the roller 41, over which the perforated web is run immediately after its passage past the circuit closer; the roller passing into and from elongated apertures 170 in the web to effect a rocking motion and operate the indicator. An aperture 170 is punched in the web opposite each character by a die 177 (Fig. XIV) that is pivotally mounted in rib 9 connected with the universal bar 73, so that it is actuated each time a key lever is depressed. By locating the apertures 170 at one side of the part of the web containing the character apertures there is no interference with the transmission and by providing the separate indicator for the characters set up and those transmitted, a clear record of the condition and performance of the machine is provided.

The number of characters set up or provided in the web is shown by the indicator or counter 162, operable by a lever 163 having connection with the link 68, so that the counter is advanced one space each time the pawl lever 70 and arm 69 are rocked by the universal bar 73 upon the depression of a key lever. In this way, I provide for separate indication of characters set up and characters transmitted.

As the keyboard may be operated at a speed greater than the speed of transmission, the web will accumulate in the storage receptacle, the amount of accumulation being recorded on the differential indicator 173 which comprises (Fig. XVII) gears 174 and 175 revolubly mounted on a stub shaft 176, the former gear being driven from the gear 95 on the upper set of rollers, while the latter gear is connected with the gear 98 on the lower set of rollers through the intermediate gear 177, so that the two gears 174 and 175 turn in opposite directions.

Rigidly secured to the inner faces of the gears 174 and 175 are bevel gears 178 which mesh with bevel pinions 179 revolubly mounted on a spider 180, which is in turn revolubly mounted on shaft 176 and secured to the sheave 181.

Passing over sheave 181 and over a sheave 182 revolubly mounted on a bracket 183, at the front of the machine, is a belt 184 having unit designations upon its surface which are visible through the aperture 185 in the casing.

In order to prevent more than one key lever being depressed at a time the latch board (Fig. XV) is provided, which comprises a plurality of latches 187 pendently mounted on pins 188 on the cross pieces 13, and having heads 189 which lie between each of the key levers and which are spaced so that but one key lever may be projected between them at a time. The latches are covered by a hood 190 having slots 191 into which the key levers project.

In operating the machine the keyboard is manipulated in the usual manner, each key lever punching one or more apertures in the web corresponding to that particular character and at the same time releasing one of the bell crank levers 52, and turning the rollers 29 and 30 a certain distance to forward the web, which is carried upwardly between rollers 36 and 37. If the keyboard is operated rapidly the web will accumulate in the receptacle 24 as shown in dotted lines (Fig. III) to be taken up by the uniformly moving rollers 36 and 37 and transmitted by means of the circuit breaker. After the last character has been sent it is necessary to operate the space key several times in order to move that part of the web lying between the circuit breaker and the rollers 29 and 30 past the circuit breaker.

The power of the spring motor is divided by the differential gearing 85 so that the key board may be operated fast or slow to intermittently forward the web into the storage receptacle 24 and at the same time revolve the rollers 36 and 37 at a uniform rate of speed.

As the rollers 29 and 30, and 36 and 37, are the same diameter and each will make the same number of revolutions as the other when a certain amount of web is passed through the machine, it is apparent that the differential indicator which is connected oppositely to each set of rollers, will be turned in one direction if one set of rollers is revolved at a greater speed than the other, and will always come back to zero as the slower set catches up. For example, if the keyboard is operated at a high rate of speed the differential indicator will show through the aperture 185 that a certain number of inches of web has collected in the receptacle which will be proportionately diminished as the characters are transmitted onto the line, and if the operation of the key board ceases the upper rollers turn the indicator back to zero.

It is apparent that a message may be repeated by raising the case 7, releasing the friction clutch 103 and turning the web backward by grasping the supply roll 33 at the front of the machine and running it through the machine again and that when a roll of paper has passed through the machine it may be stored away for record.

It is to be understood that I do not wish to limit myself to the specific form of web illustrated in the drawings as any practical form of web will suffice. For example, a web in which the characters are consecutively punched will be operative and comes within the scope of this invention.

Having thus described my invention, what I claim as new therein, and desire to secure by Letters-Patent, is:—

1. In a telegraph transmitter, means for effecting record of characters on a storage member, initial means for advancing said storage member, secondary means for advancing said storage member, a prime mover, a differential mechanism operable from the prime mover and adapted for actuating both of said advancing mechanisms to effect simultaneous operation thereof, or individual operation of either, and a circuit closer adapted for operation from said record.

2. In a telegraph transmitter, a prime mover, separately operable web forwarding mechanisms, and a differential member operable from the prime mover and connected with the web forwarding mechanisms whereby said mechanisms may be driven simultaneously, or one driven independently of the other.

3. In a telegraph transmitter, a prime mover, separately operable web forwarding mechanisms, and a differential gearing operable from the prime mover and connected with the web forwarding mechanisms whereby said mechanisms may be driven simultaneously or one driven independently of the other from the same source of power.

4. In a telegraph transmitter, primary and secondary web forwarding mechanisms adapted for independent action, a motor, a differential member operatively connected with the motor and with both of the web forwarding mechanisms, whereby said mechanisms may be driven simultaneously or independently of each other, and a governor for controlling the secondary web forwarding mechanism.

5. In combination with web-forwarding mechanisms, an escapement comprising a member operatively connected with the web-forwarding mechanisms, a device for holding said member, individual latches for advancing the holding device relative to said member, key levers controlling said latches, and means operable by the key levers to effect release of the escapement member from the holding device and detain the escapement member while the latch is released.

6. In combination with web-forwarding mechanism and driving means therefor, an escapement member operable with the driving means, a detent operable in one direction from the escapement member, means operable in one direction to advance the detent and returnable by the detent, key levers controlling said operable means, and means operable by the key levers to disconnect the detent from the escapement member.

7. In combination with web-forwarding mechanism and driving means therefor, an escapement member operable with the driving means, a detent operable in one direction from the escapement member, means operable in one direction to advance the detent and returnable by the detent, key levers controlling said operable means, and means operable by the key levers to first free the detent from the escapement member and hold said member while the detent is freed and then free the escapement member and permit return of the detent to its holding position, whereby the escapement member is advanced from the driving means and the detent and said operable means are returned to initial position.

8. In combination with web-forwarding mechanism and driving means therefor, an escapement member operable with the driving means, a detent yieldingly held in operative relation to the escapement member, a plurality of normally latched members individually operable to shift the detent along the escapement member, key levers controlling the latched members, and means operable by a key lever to rock the detent from holding relation with the escapement member.

9. In combination with web-forwarding mechanism and driving means therefor, an escapement member operable with the driving means, a detent yieldingly held in operative relation to the escapement member, a plurality of normally latched members individually operable to shift the detent along the escapement member, key levers controlling the latched members, means operable by a key lever to rock the detent from holding relation with the escapement member, and other means also operable by a key lever for holding the escapement member while the latter is free from the detent.

10. A telegraph transmitter comprising a plurality of key levers, a latch for each key lever, means for yieldingly tensioning said latches away from the levers, rollers for forwarding a character web, an escapement operatively connected with said rollers and adapted for release upon the actuation of any of said levers to forward said web and a circuit closer adapted for actuation by said web.

11. A telegraph transmitter comprising a plurality of key levers, a pivotally mounted latch for each lever, a stop member for determining the travel of each of said latches, means for yieldingly tensioning said latches toward their stop members, means for forwarding a character web, an escapement operatively connected with said forwarding means comprising a ratchet wheel, a stop pawl adapted for engagement with said ratchet wheel upon the actuation of any of the levers, a pawl adapted for actuation by the ratchet wheel and having a universal bar adapted for returning any of the latches to engagement with its lever and a circuit closer adapted for actuation by said web.

12. A telegraph transmitter comprising a plurality of individually operable key levers, driving mechanism for forwarding a character web, a latch for each of the key levers, means for yieldingly tensioning the latches away from the levers, a stop for each of said latches, an escapement ratchet operatively connected with said driving mechanism, a stop pawl having a universal bar adapted for actuation by any of the key levers to move the pawl into engagement with the escapement ratchet, an arm axially mounted concentrically with the ratchet wheel, a pawl pivotally mounted on said arm and adapted for driven engagement with the ratchet wheel, a universal bar carried by the arm and adapted for returning said latches to normal position and a circuit closer adapted for actuation by said web.

13. A telegraph transmitter comprising individually operable key levers, a latch for each lever, means for yieldingly tensioning said latches away from the levers, means for forwarding a character web, an escapement operable from said forwarding means, a pivotally mounted arm having a pawl pivotally mounted thereon and yieldingly retained in engagement with said escapement, a stop pawl adapted for engagement with the escapement and having a universal bar adapted for engagement by any of the key levers to move the pawl into engagement with the escapement, means connected with the stop pawl for releasing the pivoted pawl, a universal bar on said arm for returning any of the latches to normal position and a circuit closer adapted for actuation by said web.

14. A telegraph transmitter comprising a plurality of individually operable key levers, and means for forwarding a character web comprising an escapement for said means including a ratchet wheel, a stop pawl for said ratchet wheel having a universal bar operable by any of said key levers, a link connected with the stop pawl, a bracket connected with said link and yieldingly tensioned away from the ratchet wheel, an arm mounted concentrically with the ratchet wheel, a pawl pivotally mounted on said arm and having a roller adapted for engaging said bracket and a spring for yieldingly tensioning the pawl to contact with the ratchet wheel, a universal bar carried by said arm, pivotally mounted latches adapted for engagement with the key levers and for replacement by the universal bar on the pawl arm, means for yieldingly tensioning the latches away from the levers, stops for limiting the movement of said latches and a circuit closer adapted for actuation by said web.

15. A telegraph transmitter comprising a plurality of individually operable key levers, and means for forwarding a character web comprising an escapement including a ratchet wheel, latches adapted for engagement with the key levers, a stop pawl for the ratchet wheel, a pawl adapted for actuation by the ratchet wheel, and normally, yieldingly held in engagement therewith, common means for actuating said pawl upon the actuation of any of the key levers and a circuit closer adapted for actuation by said web.

16. A telegraph transmitter comprising a plurality of individually operable key levers and means for forwarding a character web comprising a revoluble shaft, a block mounted on said shaft, a bracket slidably mounted on said block and yieldingly tensioned toward one limit of its travel, an arc-shaped member on said bracket, a ratchet wheel revolubly mounted on the shaft, an arm revolubly mounted on the shaft and having a pawl pivotally mounted thereon and adapted for engagement with the ratchet wheel, a roller on said pawl adapted for engagement with the arc-shaped member to trip the pawl, latches adapted for engagement with said key levers, means for yieldingly tensioning the latches away from said key levers, a universal bar on said pawl arm for returning the latches to normal position, a pivotally mounted stop pawl adapted for engagement with the ratchet wheel, a universal bar for actuating the stop pawl upon actuation of any of the key levers, a connection between the stop pawl and said bracket whereby the bracket is actuated to trip the arm pawl simultaneously with the movement of the stop pawl and a circuit closer adapted for actuation by said web.

17. A telegraph transmitter comprising a plurality of individually operable key levers and means for forwarding a character web comprising a revoluble shaft, a block mounted on said shaft, a bracket slidably mounted on said block and yieldingly tensioned toward one limit of its travel, an arc-shaped member on said bracket, a ratchet wheel revolubly mounted on the shaft, an arm revolubly mounted on the shaft and having a pawl pivotally mounted thereon and adapted for engagement with the ratchet wheel, a roller on said pawl adapted for engagement with the arc-shaped member to trip the pawl, latches adapted for engagement with said levers, means for yieldingly tensioning the latches away from said levers, a universal bar on said pawl arm for returning the latches to normal position, a pivotally mounted stop pawl adapted for engagement with the ratchet wheel, a universal bar for actuating the stop pawl upon actuation of any of the key levers, connection between the stop pawl and said bracket whereby the bracket is actuated to trip the arm pawl simultaneously with the movement of the stop pawl, an indicator, connection between the indicator and the universal bar operable by the key levers whereby the indicator is actuated upon the actuation of each key lever and a circuit closer adapted for actuation by said web.

18. In a telegraph transmitter, means for preparing a record member for the transmission of telegraphic characters, mechanism for forwarding said record member, and a circuit closer operable from said record member, the forwarding mechanism being adjustable to vary the interval between characters.

19. In a telegraph transmitter, a web having perforations corresponding to telegraph characters, an escapement for forwarding said web and means for adjusting said escapement to vary the space between characters.

20. In a telegraph transmitter, a perforated web, means for forwarding said web to store telegraph characters, means for forwarding said web to transmit said characters, and a variable escapement for controlling both of said forwarding means.

21. In a telegraph transmitter, a web having perforations corresponding to telegraph characters, means for forwarding said web, and a variable escapement for controlling said forwarding means in proportion to the length of the characters.

22. In a telegraph transmitter, a web having perforations corresponding to telegraph characters, means for forwarding said web, an escapement for releasing said forwarding means to move the web the length of a character plus three telegraphic dots, and a circuit closer for transmitting said characters.

23. In a telegraphic transmitter, a web having perforations corresponding to telegraph characters of different length, means for forwarding said web, a variable escapement for releasing said forwarding means to forward said web a distance equal to the length of the character plus three telegraphic dots, and a circuit closer for transmitting said characters.

24. In a telegraph transmitter, initial web forwarding mechanism, ultimate web forwarding mechanism, a motor, transmission from the motor to the forwarding mechanism, including a differential member whereby both mechanisms may be driven simultaneously, or one driven independently of the other, and means for rewinding a web.

25. In a telegraph transmitter, initial web forwarding mechanism, ultimate web forwarding mechanism, a motor, transmission from the motor to the forwarding mechanism, including a differential member whereby both mechanisms may be driven simultaneously, or one driven independently of the other, a rewind member, and transmission connecting the motor with the rewind member, including a friction clutch, for the purpose set forth.

26. A telegraph transmitter comprising paired rollers for guiding and forwarding a character web, a circuit closer adapted for actuation by said web, a motor, and differential gearing for driving said rollers from the motor.

27. A telegraph transmitter comprising character selecting means, a circuit closer adapted for coöperation with said means, to convert characters into electrical impulses, and means for indicating the number of characters received by said selecting means.

28. In a telegraph transmitter having character indicating devices, a circuit closer adapted for transforming characters indicated by said devices into electrical impulses, and an indicator adapted for showing the number of characters transformed by the circuit closer.

29. A telegraph transmitter comprising character members and a circuit closer, a key-board for forwarding a character web, a space bar, and an indicator connected with the space bar.

30. A telegraph transmitter comprising web forwarding mechanism, a plurality of individually operable key levers adapted for actuating said mechanism, a circuit closer adapted for actuation by the web, a space bar, and an indicator connected with the space bar.

31. In a telegraph transmitter, a web having portions corresponding to telegraph characters, a circuit closer for converting said portions into electrical impulses, and an indicator for recording the number of character portions in the web.

32. In a telegraph transmitter, a perforated web, means for forwarding said web, a variable escapement for controlling said forwarding means, a circuit closer operable from said web for transmitting telegraph characters, and an indicator for indicating the number of characters transmitted.

33. In a telegraph transmitter, means for advancing a character record member, a circuit closer adapted for operation from a part of said member, and an indicator operable from a different part of said member.

34. In combination with a record web comprising a section marked for telegraphic characters and a separate section marked for indication, a circuit closer operable by the character section of the web and an indicator operable by the indicator section thereof.

35. In a telegraph transmitter, a web having apertures corresponding to telegraph characters and other apertures adjacent said character apertures, means for forwarding said web, and an indicator having a lever adapted for actuation from said second set of apertures to indicate the number of characters in the web.

36. In a telegraph transmitter, a web having apertures corresponding to telegraph characters and other apertures adjacent said character apertures, means for forwarding said web, means for converting the character apertures into electrical impulses, and an indicator operable from said second set of apertures for indicating the number of characters converted into electrical impulses.

37. A telegraph transmitter comprising means for forwarding a perforated web, a circuit closer adapted for actuation by some of the apertures of the punched web, and an indicator having a pivotally mounted arm provided with an end lever adapted for actuation by other of said apertures.

38. A telegraph transmitter comprising perforated web forwarding mechanism, a circuit closer adapted for actuation by some of the apertures in the perforated web, an indicator, an arm pivotally connected with the indicator and having a roller adapted for projection into other of the apertures of the web.

39. In a telegraph transmitter, a circuit closer, means for advancing a character web along the circuit closer, a keyboard controlling advance of the web and including a space bar, and an indicator operable by the space bar.

40. In a telegraph transmitter, a circuit closer, means for forwarding a character storage member to effect operation of the circuit closer, a plurality of independently operable key levers controlling said forwarding means, a space bar, and an indicator operable by the space bar.

41. A telegraph transmitter comprising character web forwarding mechanism, key levers for actuating said mechanism, a circuit closer adapted for transforming character indications in the web into electrical impulses, an independent key lever, and an indicator connected with the key lever, for the purpose set forth.

42. In a telegraph transmitter, a circuit closer, means for forwarding a web along the circuit closer, a plurality of individually operable character members adapted for impressing the web irrespective of the actuation of the circuit closer, and an indicator for showing accumulation of the web between the circuit closer and impressing position.

43. In a telegraph transmitter, a circuit closer, means for forwarding a record member from a setting position to position for operating the circuit closer, and an indicator operable differentially from said means to indicate amount of storage of a record member.

44. In a telegraph transmitter, a circuit closer, primary and secondary means for advancing a record member, and an indicator operable differentially from said means to indicate amount of storage of said record member.

45. In a telegraph transmitter, a circuit closer, means for acting on a record member at the circuit closer position, other means for acting on the record member at an impress position, differential gearing operable by said separate means, and an indicator operable by said gearing.

46. In a telegraph transmitter, a circuit closer, means for acting on a record member at the circuit closer position, other means for acting on the record member at an impress position, differential gearing comprising separate drive members operable by said separate means, a belt member operable differentially from said drive members, and an indicator belt operable by said belt member.

47. In a telegraph transmitter, rollers arranged in spaced pairs to advance a record web at impress and transmitting positions, a circuit closer at the transmitting position, differential gearing comprising a drive member operatively connected with each roller pair and a belt wheel operable by either or both of said gear drivers according to their relative speeds, and an indicator belt operable by said belt wheel.

48. In a telegraph transmitter, a circuit closer, a plurality of individually operable character members constituting web impressing mechanism, mechanism for actuating the circuit closer and levers, a storage compartment intermediate the circuit closer and levers, and a differentially operable indicator for showing accumulation of a web between the impressing mechanism and circuit closer.

49. A telegraph transmitter comprising character impressing mechanism and a circuit closer, paired rollers for forwarding a web, differential gearing operable by said separate pair of rollers, and an indicator belt operable by said gearing, for the purpose set forth.

50. In a telegraph transmitter, rollers arranged in spaced pairs to advance a record web at impress and transmitting positions, a circuit closer at the transmitting position, differential gearing comprising drive members connected with corresponding roller pairs and operable in opposite directions, and an indicator member operable by both or either of said drivers according to their relative speeds.

51. In a telegraph transmitter, rollers arranged in spaced pairs to advance a record web at impress and transmitting positions, a circuit closer at the transmitting position, differential gearing comprising drive members connected with corresponding roller pairs and operable in opposite directions, a belt wheel operable by both or either of said drivers according to their relative speeds, and an indicator belt operable by the belt wheel.

52. In a telegraph transmitter, an indicator, means for applying power at two points on said indicator, an indicating element, and means on the indicating element for establishing equilibrium between the two power points.

53. In a telegraph transmitter, an indicator, means for applying power at two points on said indicator, an indicator element operable from both points of power application for recording the difference in position of said points.

54. In a telegraph transmitter, a web, intermittent and continuous means for forwarding said web, an indicator comprising a differential gearing operatively connected to both of said forwarding means, a belt wheel on said differential gearing adapted to turn an amount equal to the difference between said forwardly means, and a belt on said wheel for indicating the relative positions of said forwarding means.

55. In a telegraph transmitter, a perforated web, means for continuously forwarding said web, a rewinding shaft for supporting the web after leaving the continuous forwarding means, geared connection between the continuous forwarding means and the rewinding shaft, means for intermittently forwarding the web to the continuous forwarding means, and a circuit closer operable from said web.

56. In a telegraph transmitter, a perforated web, means for continuously forwarding said web, a rewinding shaft, a friction device on said rewinding shaft, geared connection between the friction device and continuous forwarding means, means for intermittently forwarding the web to the continuous forwarding means, and a circuit closer operable from said web.

57. In a telegraph transmitter, recording and transmitter elements, means for differentially driving both of said elements, a keyboard for releasing the recording element, a governor for controlling the transmitter element and means for manually regulating the governor to change the speed of said transmitter element.

58. In a telegraph transmitter, initial web-forwarding mechanism, ultimate web forwarding mechanism, a motor, transmission from the motor to both of said web forwarding mechanisms, including a differential member, a governor for controlling the ultimate web forwarding mechanism and means for manually adjusting said governor to vary the speed of said ultimate web forwarding mechanism.

In testimony whereof I affix my signature in presence of two witnesses.

EDWIN H. PIERSEN.

Witnesses:
ARTHUR U. CAPS,
LETA E. COATS.